United States Patent
Kinoshita et al.

(10) Patent No.: US 10,527,731 B2
(45) Date of Patent: Jan. 7, 2020

(54) OBSTACLE DETECTION DEVICE

(71) Applicant: KOBELCO CONSTRUCTION MACHINERY CO., LTD., Hiroshima-shi (JP)

(72) Inventors: Akira Kinoshita, Hiroshima (JP); Yusuke Kamimura, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 16/321,521

(22) PCT Filed: Jun. 14, 2017

(86) PCT No.: PCT/JP2017/022017
§ 371 (c)(1),
(2) Date: Jan. 29, 2019

(87) PCT Pub. No.: WO2018/025512
PCT Pub. Date: Feb. 8, 2018

(65) Prior Publication Data
US 2019/0170879 A1 Jun. 6, 2019

(30) Foreign Application Priority Data
Aug. 3, 2016 (JP) ................................ 2016-153011

(51) Int. Cl.
*G01S 17/93* (2006.01)
*E02F 9/24* (2006.01)
(Continued)

(52) U.S. Cl.
CPC ............ *G01S 17/936* (2013.01); *B66C 23/88* (2013.01); *E02F 9/2033* (2013.01); *E02F 9/24* (2013.01)

(58) Field of Classification Search
CPC . E02F 9/2022; E02F 9/262; E02F 9/26; E02F 9/20; E02F 9/24; E02F 3/43;
(Continued)

(56) References Cited

U.S. PATENT DOCUMENTS

| 5,198,800 A | 3/1993 | Tozawa et al. | |
|---|---|---|---|
| 6,905,139 B2 * | 6/2005 | Akahane | B62D 21/16 220/564 |

(Continued)

FOREIGN PATENT DOCUMENTS

| JP | 4-52330 A | 2/1992 |
|---|---|---|
| JP | 2007-23486 A | 2/2007 |

(Continued)

OTHER PUBLICATIONS

International Search Report dated Sep. 12, 2017 in PCT/JP2017/022017 filed Jun. 14, 2017.

(Continued)

*Primary Examiner* — Sang H Nguyen
(74) *Attorney, Agent, or Firm* — Oblon, McClelland, Maier & Neustadt, L.L.P.

(57) ABSTRACT

When an object detected by a distance measuring sensor is located in a monitoring region set in a blind spot of an operator, an obstacle determination section determines the detected object as an obstacle. Then, the obstacle determination section sets a monitoring region so that a region indicating a lower travelling body (2) is excluded according to a slewing angle detected by an angle sensor. Based on the slewing angle detected by the angle sensor, a stop control section determines a component, of at least one of the lower travelling body and an upper slewing body, which has a possibility that a construction machine collides with the obstacle when the component is operated, and stops operation of the determined component.

8 Claims, 12 Drawing Sheets

(51) Int. Cl.
*E02F 9/20* (2006.01)
*B66C 23/88* (2006.01)

(58) Field of Classification Search
CPC ..... G01S 17/936; G01B 21/047; G01B 21/22; G01B 21/18; G01B 21/02; B66C 2/88
See application file for complete search history.

(56) References Cited

U.S. PATENT DOCUMENTS

| | | | | |
|---|---|---|---|---|
| 6,991,283 | B2* | 1/2006 | Akahane | B60R 21/13 296/155 |
| 7,103,545 | B2* | 9/2006 | Furuta | E02F 9/20 704/246 |
| 2007/0120660 | A1* | 5/2007 | Yamada | E02F 9/26 340/461 |
| 2010/0264106 | A1* | 10/2010 | Kawai | B66O 23/86 212/276 |
| 2013/0120577 | A1* | 5/2013 | Austefjord | B66O 13/02 348/148 |
| 2013/0255977 | A1 | 10/2013 | Braunstein et al. | |
| 2013/0345857 | A1* | 12/2013 | Lee | G01S 5/16 700/229 |
| 2014/0070982 | A1 | 3/2014 | Inada et al. | |
| 2014/0253511 | A1* | 9/2014 | Yagishita | G06F 3/0425 345/175 |
| 2015/0275939 | A1* | 10/2015 | Ueda | F15B 21/14 60/421 |
| 2016/0214597 | A1* | 7/2016 | Nanjo | B60K 6/485 |
| 2016/0257534 | A1* | 9/2016 | Kawai | B66O 13/50 |
| 2017/0231452 | A1* | 8/2017 | Saito | A47L 9/28 15/319 |
| 2017/0357270 | A1* | 12/2017 | Russell | G05D 1/0094 |

FOREIGN PATENT DOCUMENTS

| | | |
|---|---|---|
| JP | 2012-225732 A | 11/2012 |
| JP | 2014-31660 A | 2/2014 |
| JP | 2015-210602 A | 11/2015 |

OTHER PUBLICATIONS

Extended European Search Report dated Jun. 14, 2019 in Patent Application No. 17836619.1, 9 pages.

* cited by examiner

FIG.8
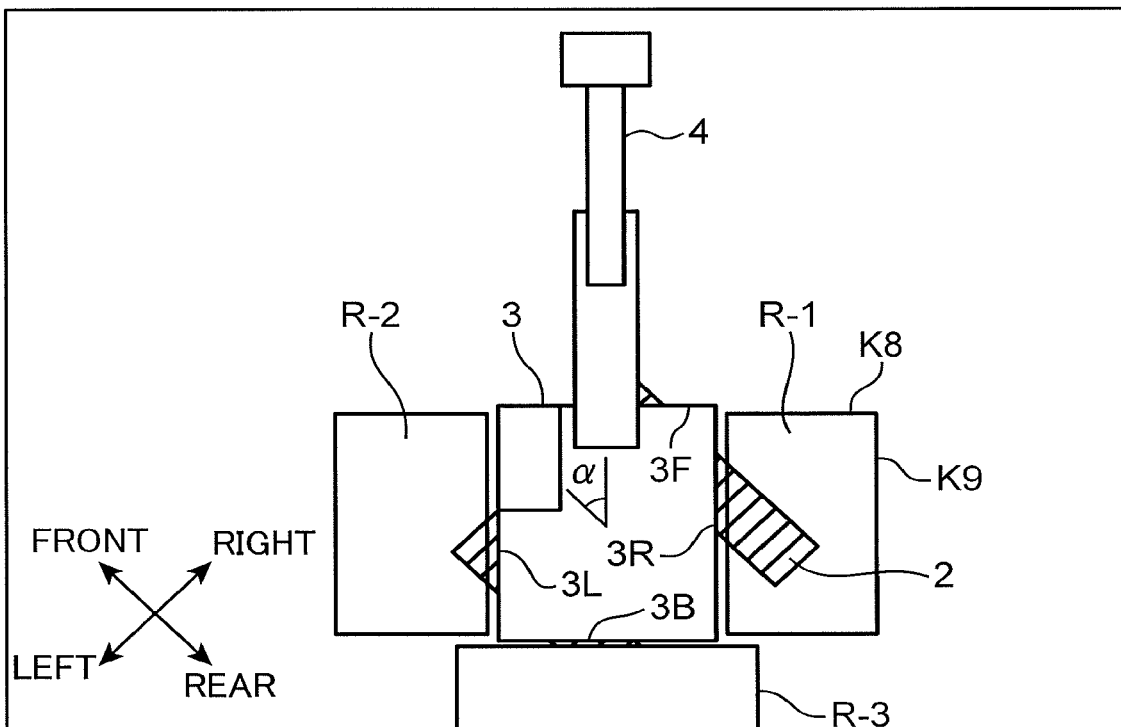
SECTION (a)
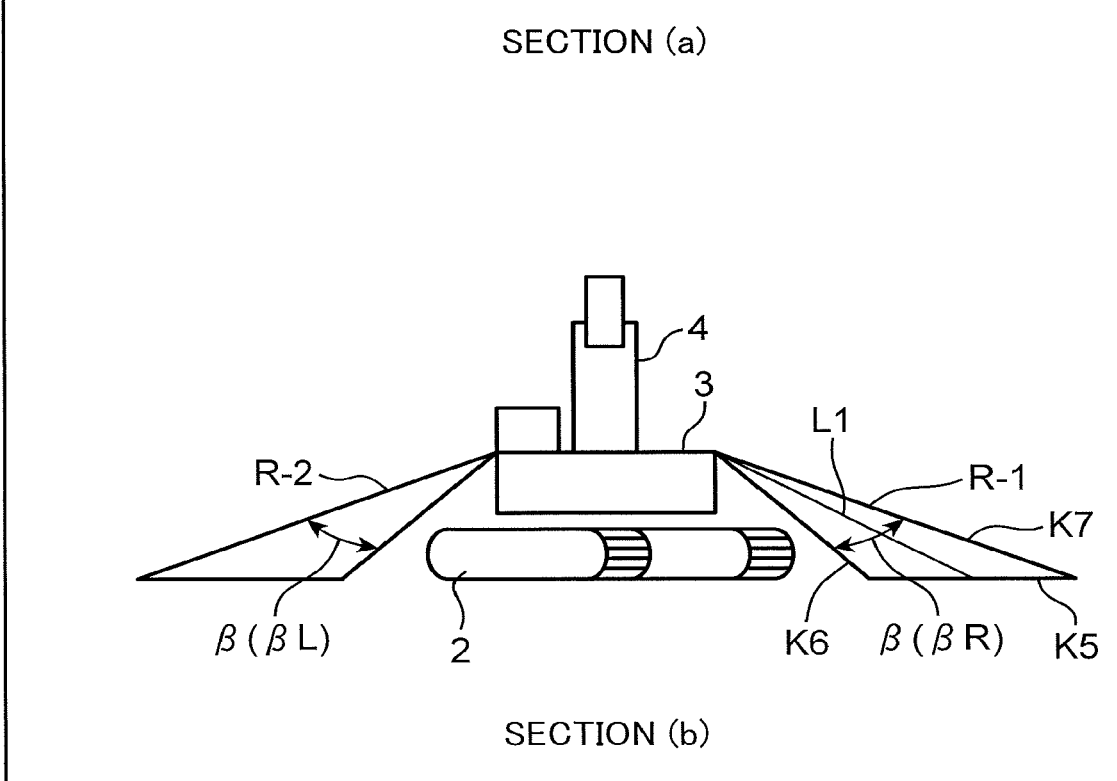
SECTION (b)

FIG.9
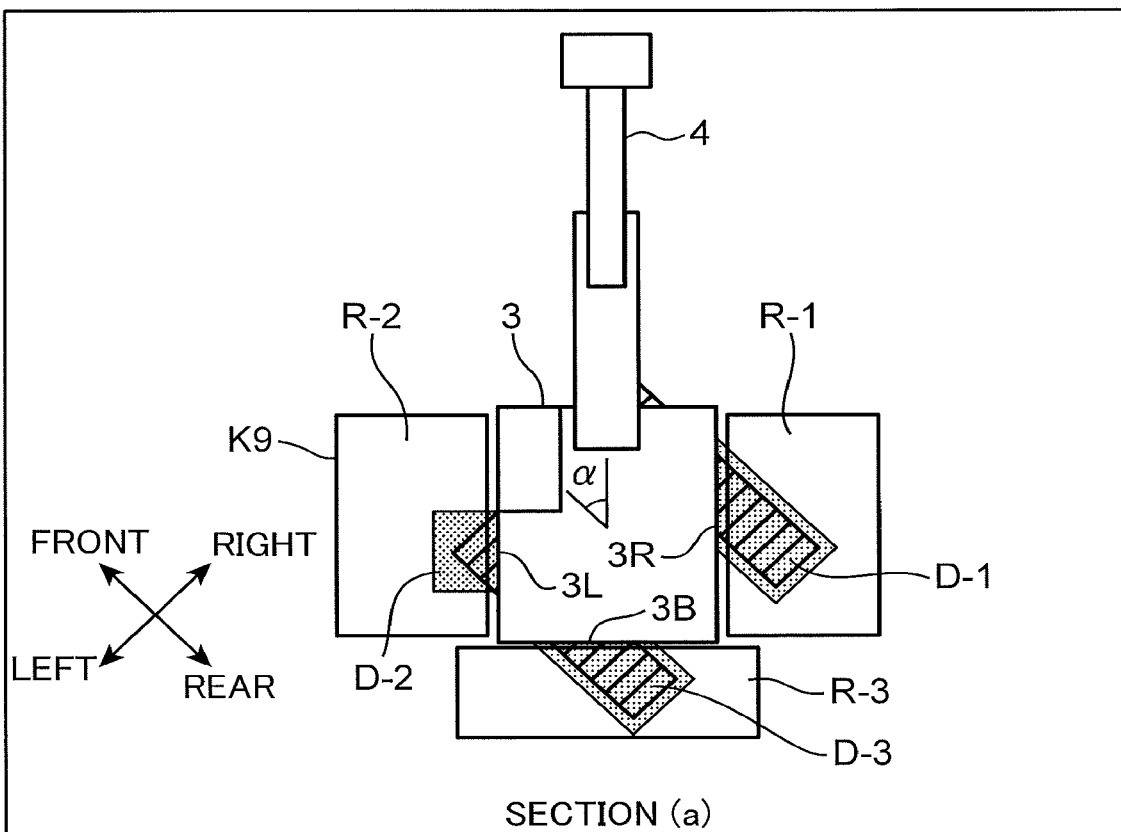
SECTION (a)
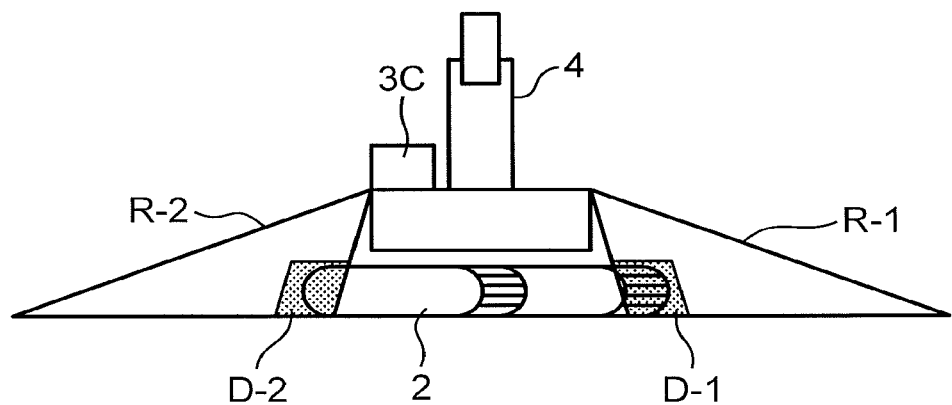
SECTION (b)

OBSTACLE DETECTION DEVICE

TECHNICAL FIELD

The present invention relates to an obstacle detection device for a construction machine provided with a lower travelling body and an upper slewing body which is pivotally mounted on an upper portion of the lower travelling body and includes a cabin that an operator boards.

BACKGROUND ART

In recent years, in a construction machine having an upper slewing body such as a hydraulic excavator or a crane, by detecting an obstacle located in surroundings and stopping an operation or issuing an alarm according to a detection result, interference between the upper slewing body and the obstacle is prevented in advance.

Patent Literature 1 discloses a technique in which, when it is detected that an obstacle detected by a millimeter wave radar is located in a collision preventing region provided around a work machine and operation in a direction to approach the obstacle is performed, operation of an upper slewing body is forcibly stopped.

However, in the technique of Patent Literature 1, when directivity of the millimeter wave radar provided on the upper slewing body is directed toward the ground in order to widen a detection range, a lower travelling body is detected as the obstacle, and operation stops and alarms unnecessarily occur frequently.

CITATION LIST

Patent Literature

Patent Literature 1: JP 2007-23486 A

SUMMARY OF INVENTION

An object of the present invention is to provide an obstacle detection device which prevents a component of a construction machine from being detected as an obstacle and an operation stop of the construction machine from being excessively performed.

An obstacle detection device according to an aspect of the present invention is an obstacle detection device for a construction machine including a lower travelling body and an upper slewing body pivotally mounted on an upper portion of the lower travelling body, including: an object detection unit provided on the upper slewing body and for detecting a three-dimensional position of an object located around the construction machine; an angle detection unit for detecting a slewing angle of the upper slewing body with respect to the lower travelling body; and an obstacle determination section for setting a monitoring region around the construction machine so that a region indicating a component of the construction machine is excluded according to the detected slewing angle, and determining the object as an obstacle when the object detected by the object detection unit is located in the set monitoring region.

According to the present invention, it is possible to prevent a component of a construction machine from being detected as an obstacle and an operation stop of the construction machine from being excessively performed.

BRIEF DESCRIPTION OF DRAWINGS

FIG. 8 is an explanatory view of a method 1 according to the embodiment of the present invention.

FIG. 9 is an explanatory view of a method 2 according to the embodiment of the present invention.

DESCRIPTION OF EMBODIMENT

An embodiment of the present invention will be described with reference to the accompanying drawings. It should be noted that the following embodiment is an example which embodies the present invention, and does not limit the technical scope of the present invention.

Figure 1:
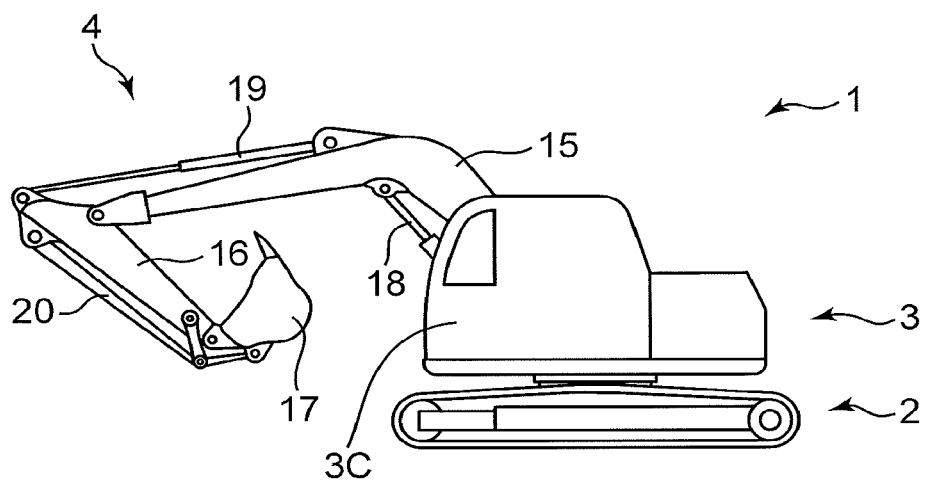
FIG. 1 is an external view of a construction machine to which an obstacle detection device according to an embodiment of the present invention is applied.

FIG. 1 is an external view of a construction machine 1 to which an obstacle detection device according to an embodiment of the present invention is applied. The construction machine 1 is constituted by a hydraulic excavator, but this is merely an example. Any construction machine may be adopted as long as it is a construction machine having an upper slewing body such as a crane.

The construction machine 1 includes a crawler type lower travelling body 2, an upper slewing body 3 pivotally provided on the lower travelling body 2, and a working device 4 attached to the upper slewing body 3.

The working device 4 includes a boom 15 attached to the upper slewing body 3 so as to be capable of rising and lowering, an arm 16 swingably attached to a tip portion of the boom 15, and a bucket 17 swingably attached to a tip portion of the arm 16.

Further, the working device 4 includes a boom cylinder 18 for raising and lowering the boom 15 with respect to the upper slewing body 3, an arm cylinder 19 for swinging the min 16 with respect to the boom 15, and a bucket cylinder 20 for swinging the bucket 17 with respect to the arm 16. The upper slewing body 3 is provided with a cabin 3C where an operator boards.

Figure 2:
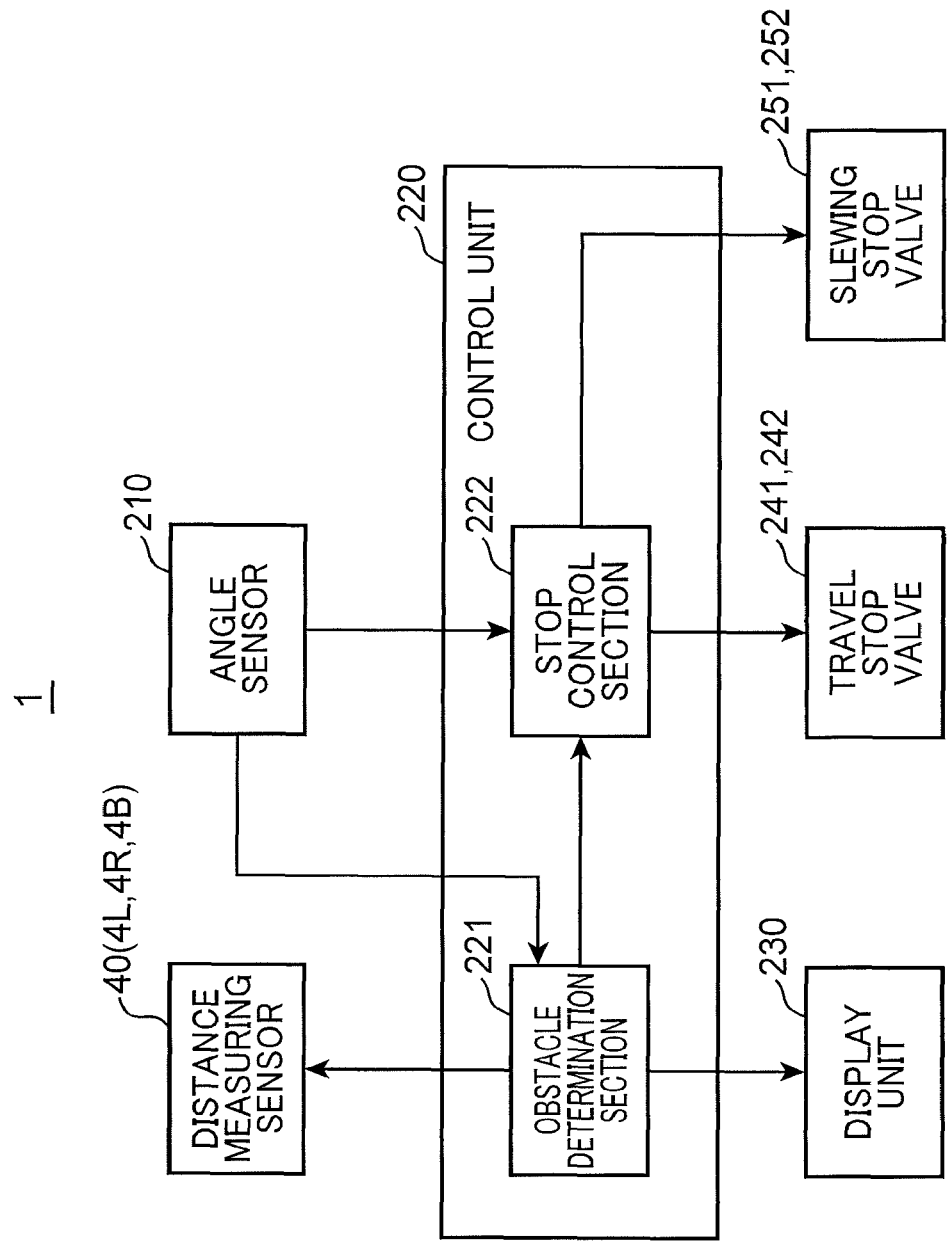
FIG. 2 is a block diagram showing a configuration of the obstacle detection device according to the embodiment of the present invention.

FIG. 2 is a block diagram showing a configuration of the obstacle detection device according to the embodiment of the present invention. The construction machine 1 includes a distance measuring sensor 40 (an example of an object detection unit), an angle sensor 210 (an example of an angle detection unit), a control unit 220, a display unit 230, travel stop valves 241, 242, and slewing stop valves 251, 252.

The distance measuring sensor 40 is constituted by a three-dimensional distance measuring sensor provided on the upper slewing body 3, and detects a three-dimensional position of an object located around the construction machine 1. The distance measuring sensor 40 is composed of, for example, a TOF (Time of flight) type three-dimensional distance measuring sensor in which infrared rays are irradiated at regular time intervals (for example, 30 fps) and time from irradiation of the infrared rays to reception of reflected light is measured in pixel units. Then, the distance measuring sensor 40 acquires a distance image showing distance distribution of a surrounding environment of the construction machine 1 with a contrast according to a distance at a frame rate of 30 fps.

Here, a stereo camera may be adopted as the distance measuring sensor 40.

Figure 5:
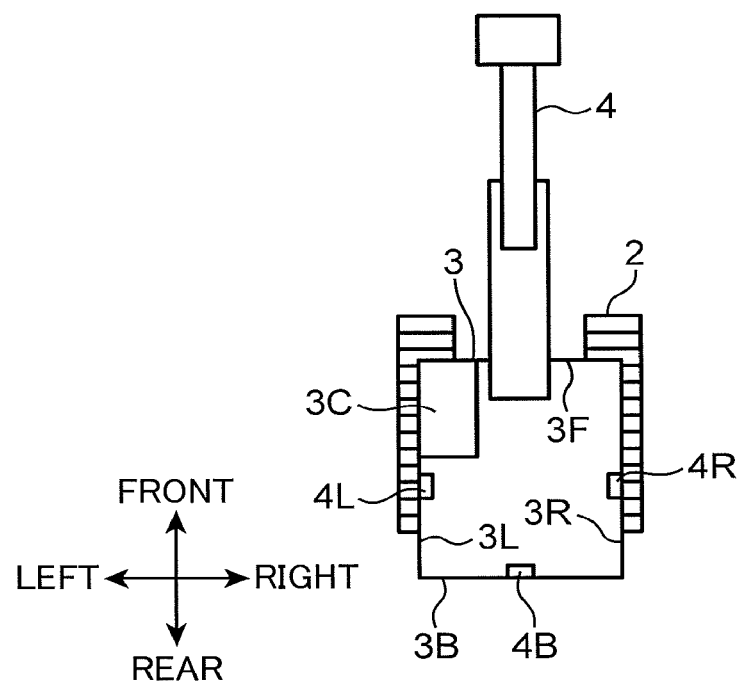
FIG. 5 is an external view of the construction machine shown in FIG. 1 when viewed from above.

As shown in FIG. 5, the distance measuring sensor 40 includes a distance measuring sensor 4L provided on a left side surface 3L of the upper slewing body 3, a distance measuring sensor 4R provided on a right side surface 3R of the upper slewing body 3, and a distance measuring sensor 4B provided on a rear side surface 3B of the upper slewing body 3.

Refer to FIG. 2. The angle sensor 210 is composed of, for example, a resolver, and detects a slewing angle of the upper slewing body 3 with respect to the lower travelling body 2.

The control unit 220 is constituted of, for example, a microcontroller including a processor such as a CPU, a memory, and the like, and includes an obstacle determination section 221 and a stop control section 222. The obstacle determination section 221 and the stop control section 222 may be realized by executing a program by the CPU, or may be realized by a dedicated hardware circuit, for example.

When an object detected by the distance measuring sensor 40 is located in a monitoring region set in a region including a blind spot of an operator, the obstacle determination section 221 determines the detected object as an obstacle. Then, the obstacle determination section 221 changes the monitoring region according to a slewing angle detected by the angle sensor 210 so that a region indicating the lower travelling body 2 is excluded.

Based on the slewing angle detected by the angle sensor 210, the stop control section 222 determines a component, of at least one of the lower travelling body 2 and the upper slewing body 3, which has a possibility that the construction machine 1 collides with the obstacle when the component is operated, and stops operation of the determined component.

The display unit 230 is composed of a display device such as a liquid crystal display. The display unit 230 displays an obstacle image in which images other than an obstacle have been removed from a distance image, and displays an overhead view image showing a position at which the obstacle is present relative to the construction machine. In addition, the display unit 230 includes a speaker, and causes the speaker to output an alarm sound when it is determined that the obstacle is present.

The travel stop valve 241 is constituted of, for example, a solenoid proportional valve, and forcibly stops forward operation of the lower travelling body 2 when an automatic stop control command is output from the stop control section 222. The travel stop valve 242 is constituted of, for example, a solenoid proportional valve, and forcibly stops backward operation of the lower travelling body 2 when an automatic stop control command is output from the stop control section 222.

The slewing stop valve 251 is constituted of, for example, a solenoid proportional valve, and forcibly stops right slewing operation of the upper slewing body 3 when an automatic stop control command is output from the stop control section 222. The slewing stop valve 252 is constituted of, for example, a solenoid proportional valve, and forcibly stops left slewing operation of the upper slewing body 3 when an automatic stop control command is output from the stop control section 222.

Figure 3:
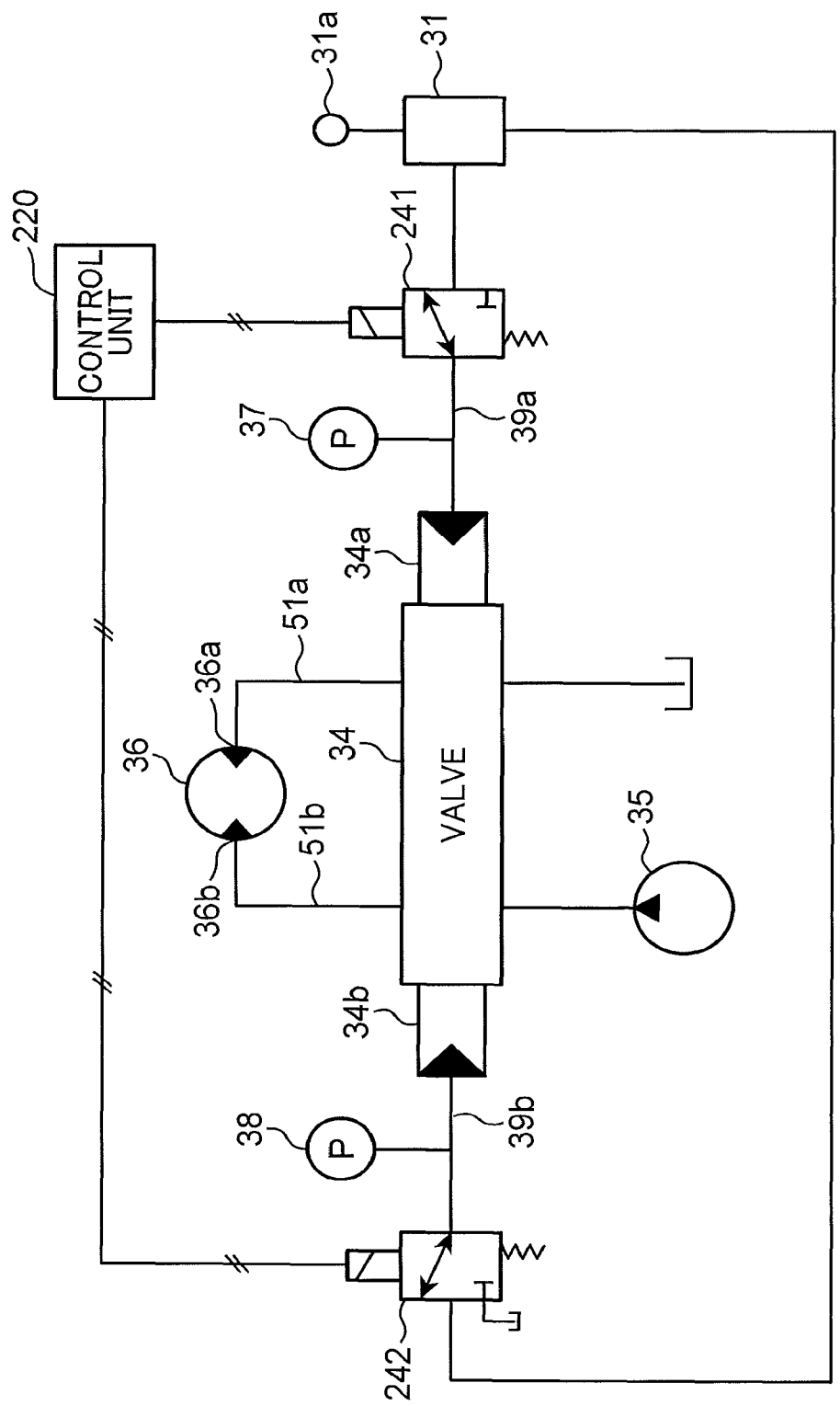
FIG. 3 is a diagram showing a hydraulic circuit of the obstacle detection device according to the embodiment of the present invention.

FIG. 3 is a diagram showing a hydraulic circuit of the obstacle detection device according to the embodiment of the present invention. FIG. 3 shows a hydraulic circuit of the lower travelling body 2. This hydraulic circuit includes an operation unit 31, the travel stop valves 241 and 242, a control valve 34, a hydraulic pump 35, a travel motor 36, and pressure sensors 37 and 38. In this hydraulic circuit, a pilot pressure corresponding to an operation amount of the operation unit 31 is supplied to the control valve 34. The control valve 34 controls a flow rate and a direction of hydraulic oil supplied from the hydraulic pump 35 according to the pilot pressure. As a result, the travel motor 36 is operated in accordance with the hydraulic oil supplied from the control valve 34.

The control valve 34 includes a pilot switching valve having pilot ports 34a and 34b. When the pilot pressure is supplied to the pilot port 34a, the control valve 34 supplies the hydraulic oil to a port 36a of the travel motor 36 through a hydraulic line 51a. On the other hand, when the pilot pressure is supplied to the pilot port 34b, the control valve 34 supplies the hydraulic oil to a port 36b of the travel motor 36 through a hydraulic line 51b.

The operation unit 31 is constituted by a remote control valve including an operation lever 31a, and outputs a pilot pressure according to an operation amount of the operation lever 31a. Here, when the operation lever 31a is operated in a direction of moving the lower travelling body 2 forward, the operation unit 31 inputs a pilot pressure corresponding to the operation amount to the pilot port 34a through a pilot line 39a. On the other hand, when the operation lever 31a is operated in a direction of moving the lower travelling body 2 backward, the operation unit 31 outputs a pilot pressure corresponding to the operation amount to the pilot port 34b via a pilot line 39b.

The travel motor 36 is constituted by a hydraulic motor. When the hydraulic oil is supplied to the port 36a, the travel motor 36 moves the lower travelling body 2 forward. When the hydraulic oil is supplied to the port 36b, the travel motor 36 moves the lower travelling body 2 backward.

The travel stop valve 241 is provided in the pilot line 39a. The travel stop valve 242 is provided in the pilot line 39b. When an automatic stop control command is output from the control unit 220, the travel stop valve 241 blocks the pilot line 39a and prevents input of the pilot pressure to the pilot port 34a. As a result, even if forward operation is input, a forward movement is not performed. When an automatic stop control command is output from the control unit 220, the travel stop valve 242 blocks the pilot line 39b and prevents input of the pilot pressure to the pilot port 34b. As a result, even if backward operation is input, a backward movement is not performed.

The pressure sensors 37, 38 are provided in the pilot lines 39a, 39b, respectively, to detect the pilot pressure and output it to the control unit 220. This pilot pressure is used when the control unit 220 judges whether or not operator's operation is input to the operation unit 31.

Although the hydraulic circuit of the lower travelling body 2 has been described above, a hydraulic circuit for slewing the upper slewing body 3 also adopts the same configuration as that shown in FIG. 3. In this case, in FIG. 3, the travel motor 36 becomes a slewing motor, the operation unit 31 becomes an operation unit for inputting slewing operation, the travel stop valve 241 becomes a slewing stop valve for automatically stopping a right slewing, and the travel stop valve 242 becomes a slewing stop valve for automatically stopping a left slewing.

FIG. 5 is an external view of the construction machine 1 shown in FIG. 1 as viewed from above. In FIG. 5, a front direction refers to a forward direction of the lower travelling body 2, and a rear direction refers to a backward direction of the lower travelling body 2. Hereinafter, a direction generically referring to the front direction and the rear direction is called a front-rear direction. A left direction indicates a left side direction when the lower travelling body 2 is seen from the rear to the front, and a right direction indicates a right side direction when the lower travelling body 2 is seen from the rear to the front. Hereinafter, a direction generically referring to the right direction and the left direction is called a left-right direction.

The upper slewing body 3 has a quadrangular shape in a top view, and includes a front side surface 3F, the left side surface 3L, the right side surface 3R, and the rear side surface 3B. On the front side surface 3F, the working device 4 extends forward. The distance measuring sensor 4L is provided at a substantially intermediate position in the front-rear direction of the left side surface 3L. The distance measuring sensor 4R is provided at a substantially intermediate position in the front-rear direction of the right side surface 3R. In this example, the distance measuring sensors 4L, 4R are mounted symmetrically on the upper slewing body 3. The distance measuring sensor 4B is provided at a substantially intermediate position in the left-right direction of the rear side surface 3B.

In the top view, the cabin 3C is disposed at the upper left of the upper slewing body 3, and the operator boards the cabin 3C. The display unit 230 and the operation unit 31 described above are provided in the cabin 3C.

Figure 6:
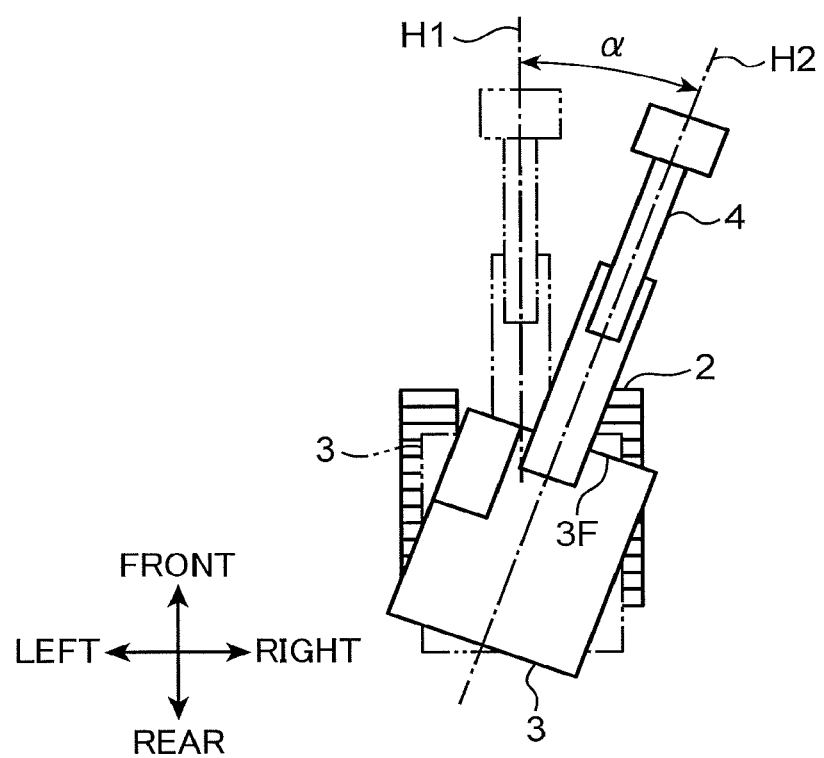
FIG. 6 is an external view showing the construction machine in a top view when an upper slewing body is slewed with respect to a lower travelling body.

FIG. 6 is an external view showing the construction machine 1 in a top view when the upper slewing body 3 is slewed with respect to the lower travelling body 2. A slewing angle $\alpha$ is defined by an angle of a forward direction H2 of the upper slewing body 3 with respect to a forward direction H1 of the lower travelling body 2. The direction H1 is parallel to the front-rear direction. The direction H2 is a longitudinal direction of the upper slewing body 3, and is a direction orthogonal to the front side surface 3F. Hereinafter, when the direction H1 and the direction H2 are directed in the same direction, the slewing angle $\alpha$ is set to 0°. Further, as a right slewing amount of the upper slewing body 3 increases, the slewing angle $\alpha$ increases in a plus direction, and as a left turning amount of the upper slewing body 3 increases, the slewing angle $\alpha$ increases in a minus direction.

Figure 7:
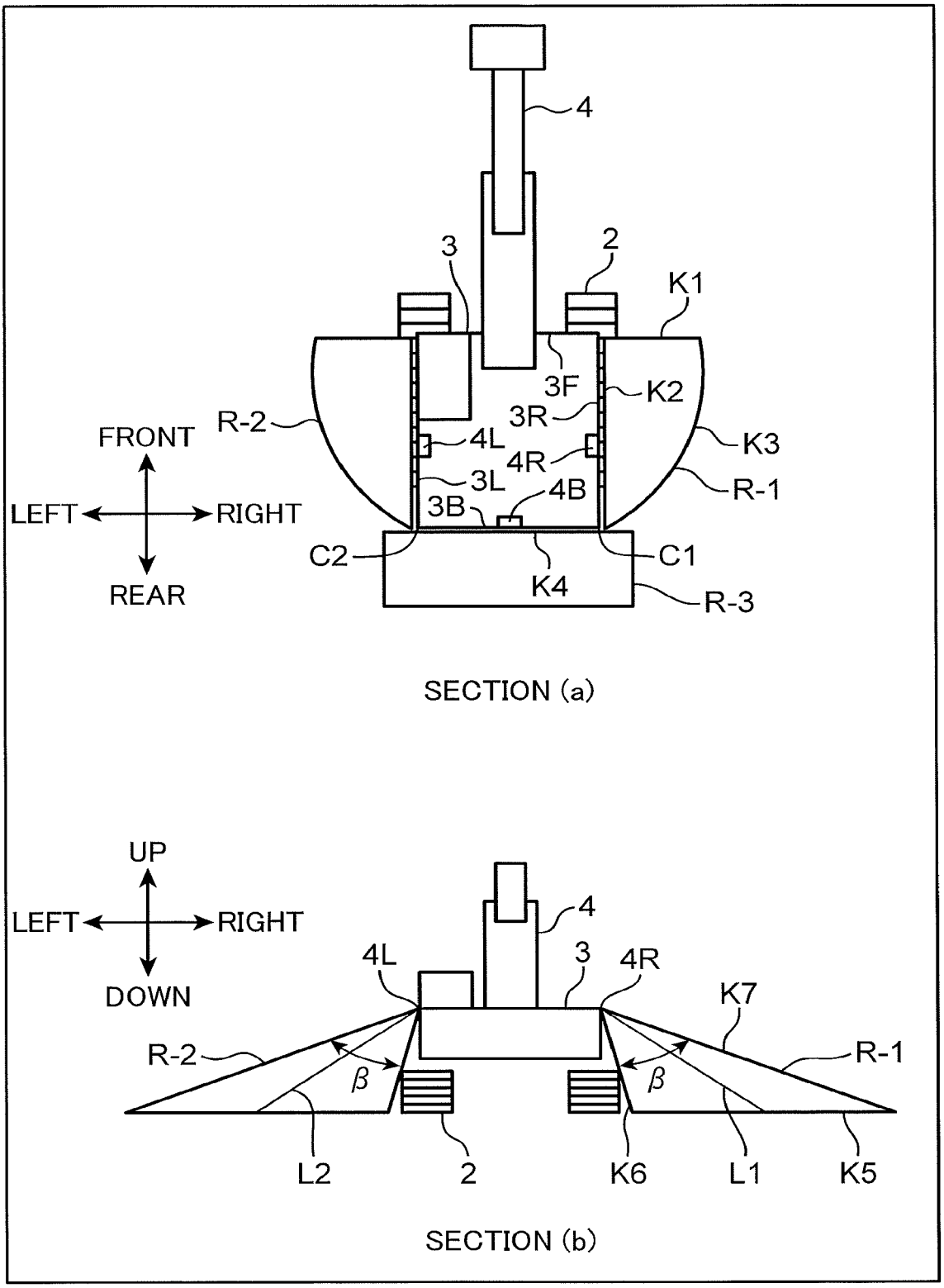
FIG. 7 is a view showing a monitoring region set around the construction machine.

FIG. 7 is a view showing monitoring regions R-1, R-2, and R-3 set around the construction machine 1. Hereinafter, when the monitoring regions R-1, R-2, and R-3 are collectively referred, they are described as a monitoring region R. Section (a) of FIG. 7 shows the monitoring region R in a top view, and section (b) shows the monitoring region R in a side view.

The monitoring region R is set to a region where it is difficult for an operator to directly see. In FIG. 7, the monitoring region R set when the slewing angle $\alpha$=0 degrees is shown. As shown in section (a) of FIG. 7, the monitoring region R-1 is the monitoring region R provided on a right side of the upper slewing body 3, and is set within a detection region where the distance measuring sensor 4R can detect an object. This also applies to the other monitoring regions R-2 and R-3.

In the monitoring region R-1, a front side K1 is set flush with the front side surface 3F, an inner side K2 is set along the right side surface 3R, and an outer side K3 is set in a curved shape so that a width in the left-right direction is shortened toward the rear. Note that the side K3 has a shape that follows a locus of a lower right vertex C1 when the upper slewing body 3 is slewed to the left. This is because it is considered that, when the upper slewing body 3 makes the left slewing, a possibility that an object located in a region outside the side K3 collides with the upper slewing body 3 is low.

The monitoring region R-2 is a monitoring region R provided on a left side of the upper slewing body 3. The monitoring region R-2 has a shape symmetrical with the monitoring region R-1 when viewed from the top.

The monitoring region R-3 is a monitoring region R provided behind the upper slewing body 3. The monitoring region R-3, in the top view, is set to be quadrilateral, and a width in the left-right direction is set to a length somewhat larger than a width in the left-right direction of the rear side surface 3B.

A reason why the monitoring region R-3 is set to be quadrilateral is that the rear side surface 3B is parallel to the left-right direction in the top view. Therefore, if the rear side surface 3B has a curved shape, the monitoring region R-3 may be curved along the shape of the rear side surface 3B.

As shown in section (b) of FIG. 7, in the side view, the monitoring region R-1 has a triangular shape with the distance measuring sensor 4R as an upper vertex, and a center line L1 of a view angle $\beta$ is set diagonally downward to the right so as to direct toward the ground. It should be noted that the center line L1 is directed in an up-down direction as viewed in the left direction. The monitoring region R-1 in a case of viewing the monitoring region R-1 from the rear to the front is the monitoring region R-1 in the side view. In an example of section (b) of FIG. 7, the view angle $\beta$ is set so that the monitoring region R-1 is divided into two at the center line L1, for example. In the monitoring region R-1, in the side view, a lower side K5 is set parallel to the ground, an inner side K6 is set obliquely downward to the right so as not to contact the lower travelling body 2, and an outer side K7 is set diagonally downward to the right across the view angle $\beta$ between the sides K6 and K7.

As shown in section (b) of FIG. 7, the monitoring region R-2 is set symmetrically with the monitoring region R-1 in the side view. In other words, the monitoring region R-2 is set such that the distance measuring sensor 4L is a vertex and that a center line L2 of a view angle $\beta$ is directed obliquely downward to the left in the side view.

Although not shown, the monitoring region R-3 in the side view has a triangular shape set so that a center line is directed obliquely rearward to the right like the monitoring regions R-1 and R-2.

As described above, according to the slewing angle detected by the angle sensor 210, the obstacle determination section 221 sets the monitoring region so that the region indicating the lower travelling body 2 is excluded. In the present embodiment, the obstacle determination section 221 realizes this setting by using the following two methods.

(Method 1)

In a method 1, the obstacle determination section 221 sets a view angle of the distance measuring sensor 40 to a predetermined view angle where the lower travelling body is excluded according to a slewing angle $\alpha$.

FIG. 8 is an explanatory view of the method 1, and shows a monitoring region R when the upper slewing body 3 is slewed at the slewing angle $\alpha$ (>0). Section (a) of FIG. 8 shows the monitoring region R in a top view, and section (b)

of FIG. 8 shows the monitoring region R when the upper slewing body 3 is seen from the rear to the front.

As shown in section (a) of FIG. 8, when the upper slewing body 3 is slewed, a monitoring region R-1 has a quadrangular shape of a size covering an entire region of the lower travelling body 2 in the top view. A horizontal side K8 has a length obtained by adding a certain margin to a length in a lateral direction of the lower travelling body 2 protruding to the right from the upper slewing body 3. A vertical side K9 has the same length as a length in a vertical direction of the right side surface 3R.

A monitoring region R-2 has a quadrilateral shape symmetrical with the monitoring region R-1 in the top view. A monitoring region R-3 is the same as the monitoring region R-3 in section (a) of FIG. 7 in the top view.

In an example of section (a) in FIG. 8, since the lower travelling body 2 protrudes more on a right side than a left side in the lateral direction with respect to the upper slewing body 3, the monitoring region R-2 is set to have the same size as the size of the monitoring region R-1. If an amount of protrusion in the lateral direction of the lower travelling body 2 with respect to the upper slewing body 3 is larger on the left side than on the right side, the monitoring region R-1 is set to the same size as the size of the monitoring region R-2.

As shown in section (b) of FIG. 8, in the method 1, a view angle β is set such that the monitoring region R-1 does not overlap with the lower travelling body 2 in a side view. Specifically, the view angle β is set so that a side K6 passes slightly outside the lower travelling body 2 in the monitoring region R-1.

In the side view, the monitoring region R-2 is set symmetrically with the monitoring region R-1. Here, if the amount of protrusion in the lateral direction of the lower travelling body 2 with respect to the upper slewing body 3 is larger on the right side than on the left side, the size of the monitoring region R-2 may be set on the basis of the size of the monitoring region R-1. On the other hand, if the amount of protrusion in the lateral direction of the lower travelling body 2 with respect to the upper slewing body 3 is larger on the left side than on the right side, the size of the monitoring region R-1 may be set based on the size of the monitoring region R-2.

Note that, in the example of FIG. 8, since an amount by which the lower travelling body 2 protrudes behind the upper slewing body 3 is small even if the upper slewing body 3 is slewed, a view angle β of the monitoring region R-3 is not changed. However, this is merely an example. As in the monitoring regions R-1 and R-2, in the monitoring region R-3, the view angle may be set so that the lower travelling body 2 is not included.

The region of the lower travelling body 2 protruding from the upper slewing body 3 varies according to the slewing angle α, and a size of this region can be known in advance by measurement. Therefore, in the present embodiment, the obstacle determination section 221 may store a table in which a relationship between the slewing angle α and the view angle β where the lower travelling body 2 does not overlap with the monitoring region R is previously associated. By referring to this table, the obstacle determination section 221 may set the view angle β according to the slewing angle α.

Note that, in the example of section (b) of FIG. 8, the monitoring region R-1 and the monitoring region R-2 are set symmetrically, but this is only an example. For example, view angles β$R$, β$L$ may be individually set such that the monitoring region R-1 and the monitoring region R-2 do not overlap with the lower travelling body 2.

In this case, the obstacle determination section 221 may determine the view angles β$R$, β$L$ by using a table in which the slewing angle α and the view angles β$R$, β$L$ are associated with each other.

Figure 4:
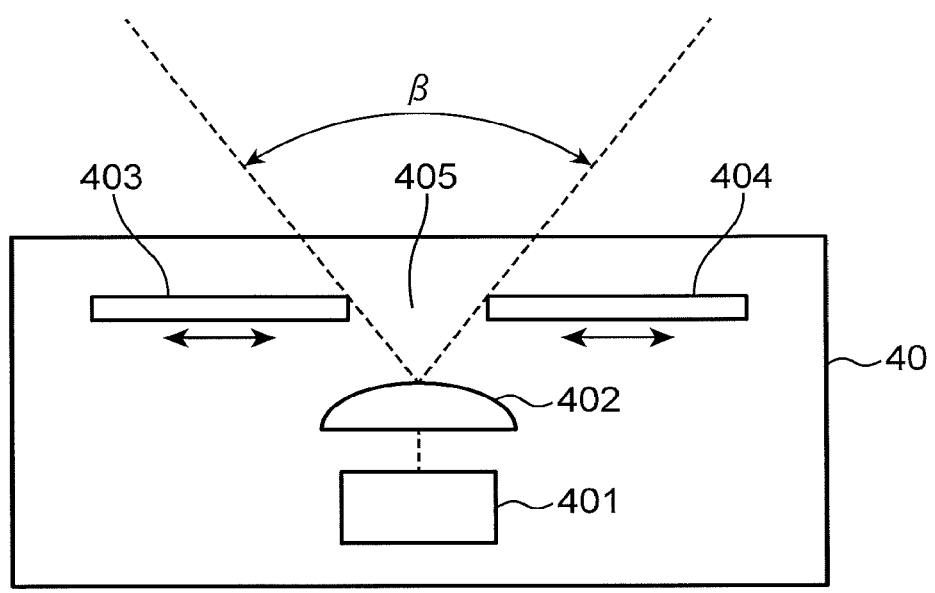
FIG. 4 is a diagram showing an example of a configuration of a distance measuring sensor.

FIG. 4 is a diagram showing an example of a configuration in the vicinity of an opening 405 of the distance measuring sensor 40. The distance measuring sensor 40 includes a light source 401, a lens 402, and a pair of right and left shutters 403 and 404. The light source 401 is composed of, for example, a light emitting diode that irradiates infrared rays. The lens 402 diffuses infrared light irradiated from the light source 401. The infrared light having passed through the lens 402 is partially blocked at both ends by the shutters 403 and 404, and is irradiated outside through the opening 405.

The shutters 403, 404 are disposed to freely slide in a lateral direction indicated arrows, receiving power from an actuator (not shown). Here, when the actuator rotates in a forward direction, the shutters 403, 404 approach, for example, equally to the left and right, and when the actuator rotates in a reverse direction, the shutters 403, 404 move away equally to the left and right.

Therefore, the obstacle determination section 221 may adjust the view angle β by rotating the actuator in the forward direction when narrowing the view angle β and by rotating the actuator in the reverse direction when expanding the view angle β.

(Method 2)

In a method 2, the obstacle determination section 221 sets a monitoring region R in a distance image so that a predetermined region of the lower travelling body 2 is excluded according to the slewing angle α. In the method 2, a view angle β of the distance measuring sensor 40 is not adjusted.

FIG. 9 is an explanatory view of the method 2, and shows the monitoring region R when the upper slewing body 3 is slewed at the slewing angle α (>0). Section (a) of FIG. 9 shows the monitoring region R in a top view, and section (b) of FIG. 9 shows the monitoring region R when the upper slewing body 3 is seen from the rear to the front. As shown in section (a) of FIG. 9, monitoring regions R-1 and R-2 have an outer peripheral shape of a bilaterally symmetrical quadrangle in the top view as in section (a) of FIG. 8.

In this example, the upper slewing body 3 is slewed clockwise by the slewing angle α. Accordingly, in the lower travelling body 2, a rear end side of a right crawler protrudes from the right side surface 3R obliquely downward to the right, a rear end side of a left crawler protrudes from the rear side surface 3B obliquely downward to the right, and a front end side of the left crawler protrudes from the left side surface 3L obliquely upward to the left.

Therefore, as shown in section (a) of FIG. 9, exclusion regions D-1, D-2, D-3 are set in regions of the lower travelling body 2 protruding from the upper slewing body 3, and the exclusion regions D-1, D-2, and D-3 are excluded from the monitoring regions R-1, R-2, and R-3, respectively. Hereinafter, when the exclusion regions D-1, D-2, and D-3 are collectively referred, they are described as an exclusion region D.

As shown in section (b) of FIG. 9, the monitoring regions R-1 and R-2 have an outer peripheral shape of a bilaterally symmetrical triangle in a side view as in section (b) of FIG. 7. The rear end side of the right crawler of the lower travelling body 2 protrudes from the upper slewing body 3, and the front end side of the left crawler protrudes from the upper slewing body 3.

Therefore, as shown in section (b) of FIG. 9, the exclusion regions D-1 and D-2 are set in the regions of the lower travelling body 2 protruding from the upper slewing body 3, and the monitoring regions R-1 and R-2 are set so as to exclude the exclusion regions D-1 and D-2.

As can be seen from FIG. 9, each of the exclusion region D has a three-dimensional shape that covers a part of the lower travelling body 2 that protrudes from the upper slewing body 3. Here, if the slewing angle α is known, a region corresponding to the exclusion region D in a coordinate space of the distance measuring sensor 40 can be determined in advance from a shape of the lower travelling body 2 and an attachment position of the distance measuring sensor 40. In view of this, the obstacle determination section 221 may include a table in which relationships between the slewing angle α and the monitoring regions R-1, R-2, R-3, from which the exclusion regions D-1, D-2, D-3 have been removed, are associated in the respective distance images of the distance measuring sensors 4R, 4L, 4B. By referring to this table, the obstacle determination section 221 may set the monitoring region R according to the slewing angle α.

Figure 10:
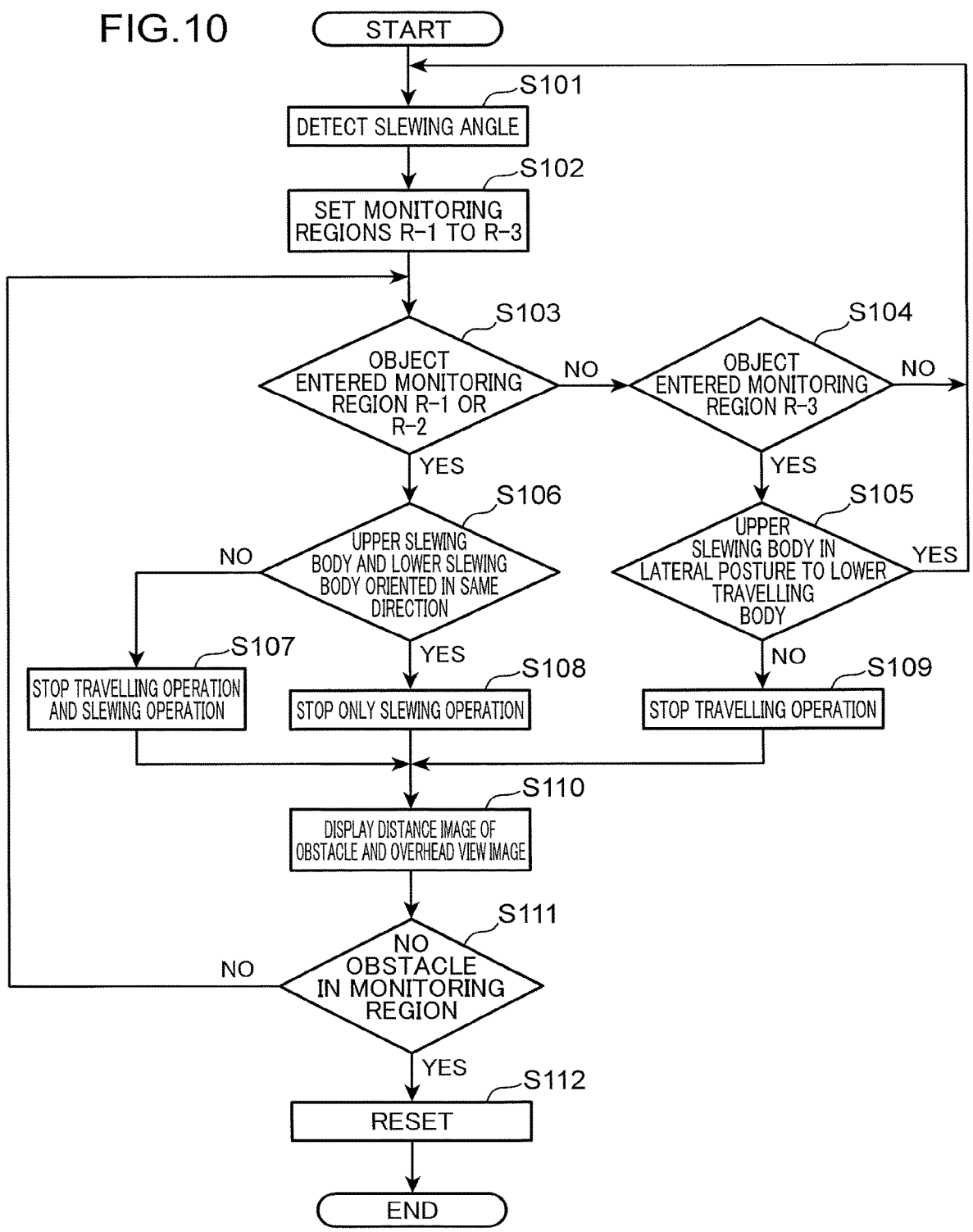
FIG. 10 is a flowchart showing a process of the obstacle detection device according to the embodiment of the present invention.

FIG. 10 is a flowchart showing a process of the obstacle detection device according to the embodiment of the present invention. This flowchart is executed, for example, when the obstacle determination section 221 detects an object in the distance image acquired by the distance measuring sensor 40.

First, the angle sensor 210 detects the slewing angle α (S101). Next, the obstacle determination section 221 sets the monitoring regions R-1, R-2, and R-3 according to the slewing angle α. Here, if the method 1 is adopted, the view angle β is adjusted so that the lower travelling body 2 is not included, whereby the monitoring regions R-1, R-2, R-3 are set. Also, if the method 2 is adopted, the monitoring regions R-1, R-2, and R-3 are set so that the exclusion regions D-1, D-2, and D-3 are excluded in the distance image.

Next, the obstacle determination section 221 determines whether the object has entered the monitoring region R-1 or R-2 (S103). Here, the obstacle determination section 221 detects, as a single object, a group of pixel groups whose distances are continuous in the distance image. If a part of the object has entered the monitoring region R-1 or R-2, the obstacle determination section 221 may determine that the object has entered the monitoring region R-1 or R-2. Then, the obstacle determination section 221 determines the object that has entered the monitoring region R-1 or R-2 as an obstacle. This also applies to the monitoring region R-3.

If the object has entered the monitoring region R-1 or R-2 (YES in S103), the obstacle determination section 221 determines whether or not the upper slewing body 3 and the lower travelling body 2 are oriented in the same direction (S106). Here, the same direction means that the slewing angle α is substantially 0 degrees. The substantially 0 degrees means that the slewing angle α is not limited to 0 degrees and includes an angular range obtained by adding a constant margin in a plus direction and a minus direction with respect to the 0 degrees. As the margin, for example, as shown in section (a) of FIG. 6, it is possible to adopt an angle so that, even if the upper slewing body 3 slightly slews, the upper slewing body 3 does not protrude from the lower travelling body 2 in the left-right direction.

If the upper slewing body 3 and the lower travelling body 2 are not oriented in the same direction (NO in S106), the stop control section 222 determines that the construction machine 1 may collide with the obstacle when either one of the lower travelling body 2 and the upper slewing body 3 is operated. Thus, the stop control section 222 automatically stops travelling operation of the lower travelling body 2 and slewing operation of the upper slewing body 3 (S107). Here, the stop control section 222 may stop the travelling operation and the slewing operation by outputting an automatic stop control signal to the travel stop valves 241, 242 and the slewing stop valves 251, 252.

If the upper slewing body 3 and the lower travelling body 2 are oriented in the same direction (YES in S106), the stop control section 222 determines that the construction machine 1 may collide with the obstacle when the upper slewing body 3 is operated. Thus, the stop control section 222 automatically stops only the upper slewing body 3 (S108). Here, the stop control section 222 may automatically stop the upper slewing body 3 by outputting an automatic stop control signal to the slewing stop valves 251, 252.

As shown in section (a) of FIG. 7, when the obstacle is located in the monitoring region R-1 or R-2, in a case where the upper slewing body 3 and the lower travelling body 2 are oriented in the same direction (1: YES in S106), even when the lower travelling body 2 travels forward or backward, a possibility of the construction machine 1 colliding with the obstacle is low. Thus, it is not necessary to stop the travelling operation of the lower travelling body 2.

Therefore, in the present embodiment, in the case (1), only the slewing operation of the upper slewing body 3 is automatically stopped (S108).

On the other hand, referring to section (a) of FIG. 8, when the obstacle is located in the monitoring region R-1 or R-2, in a case where the upper slewing body 3 and the lower travelling body 2 are not oriented in the same direction (2: NO in S106), the lower travelling body 2 protrudes from the upper slewing body 3. Accordingly, when either one of the travelling operation and the slewing operation is performed, the construction machine 1 may collide with the obstacle.

Therefore, in the present embodiment, in the case (2), the operations of the upper slewing body 3 and the lower travelling body 2 are both stopped (S107).

If the object has not entered the monitoring region R-1 or R-2 (NO in S103) but has entered the monitoring region R-3 (YES in S104), the obstacle determination section 221 determines that the object is an obstacle, and determines whether or not the upper slewing body 3 and the lower travelling body 2 are in a lateral posture (S105). Here, the lateral posture means that an absolute value of the slewing angle α is substantially 90 degrees. The substantially 90 degrees means that the absolute value of the slewing angle α is not limited to 90 degrees and includes an angular range obtained by adding a certain margin in the plus direction and the minus direction with respect to 90 degrees. As the margin, for example, an angle within a range of 1 to 10 degrees can be adopted, but this is only an example.

As shown in the section (a) of FIG. 8, when the obstacle is located in the monitoring region R-3, in a case where the upper slewing body 3 is not in the lateral posture with respect to the lower travelling body 2 (3: NO in S105), the construction machine 1 may collide with the obstacle when the lower travelling body 2 performs the travelling operation. However, even if the slewing operation is performed in the case (3), a possibility of the construction machine 1 colliding with the obstacle is low. Therefore, in the present embodiment, in the case (3), the stop control section 222 determines that the construction machine 1 may collide with the obstacle when the lower travelling body 2 is operated, and stops only the travelling operation of the lower travelling body 2 (S109).

On the other hand, as can be understood from section (a) of FIG. 8, when the obstacle is located in the monitoring region R-3, in a case where the upper slewing body 3 assumes a lateral posture with respect to the lower travelling body 2 (4: YES in S105), even if the lower travelling body 2 performs the travelling operation, the lower travelling body 2 does not protrude behind the upper slewing body 3. Accordingly, even if either one or both of the slewing operation and the travelling operation is/are performed, a possibility of the construction machine 1 colliding with the obstacle is low.

Therefore, in the present embodiment, in the case (4), both the travelling operation and the slewing operation are not automatically stopped, and the process returns to S101.

Further, if the object has not entered any of the monitoring regions R-1, R-2, R-3 (NO in S103, NO in S104), the process returns to S101, and monitoring of an object is continued.

In step S110, the obstacle determination section 221 displays, on the display unit 230, an obstacle image in which regions other than the obstacle have been removed from the distance image acquired by the distance measuring sensor 40 and an overhead view image indicating a relative position of the obstacle with respect to the construction machine 1.

Here, the obstacle determination section 221 may generate the obstacle image by joining distance images acquired by the distance measuring sensors 4L, 4R, and 4B and removing objects other than the object determined to be the obstacle, and display the obstacle image on the display unit 230. Since the distance image is an image having a contrast according to a distance unlike a visible image, even if the distance image is displayed on the display unit 230 as it is, it is difficult for an operator to recognize which object is the obstacle. Therefore, in the present embodiment, the obstacle image is generated by removing the objects other than the obstacle and displayed on the display unit 230. As a result, a silhouette of the obstacle is clarified, and the operator can immediately judge what the obstacle is.

Since only the obstacle is displayed in the obstacle image, the operator cannot recognize where the obstacle is located relative to the construction machine 1. Therefore, in the present embodiment, the overhead view image is generated together with the obstacle image and displayed on the display unit 230.

Here, the obstacle determination section 221 calculates a relative position of the obstacle with respect to the construction machine 1 from the distance image acquired by the distance measuring sensor 40. Then, the obstacle determination section 221 may generate an overhead view image including an image of the construction machine 1 in a top view and marked with an obstacle around the image, and display the overhead view image on the display unit 230. Note that the display unit 230 may divide a display area into two, display the obstacle image in one display area, and display the overhead view image in another display area.

In this way, by displaying the overhead view image in accordance with the obstacle image, the operator can promptly recognize what the obstacle is and where the obstacle is located with respect to the construction machine 1.

Next, the obstacle determination section 221 confirms whether there is no obstacle in the monitoring region R (S111). If there is no obstacle in the monitoring region R (YES in S 111), the obstacle determination section 221 executes a reset process (S112) and ends the process. On the other hand, if the obstacle is not lost from the monitoring region R (NO in S111), the process returns to S103, and the processes of S103 to S111 are repeated until there is no obstacle in the monitoring region R. In S111, for example, if the obstacle is a person, the operator alerts the person, so that the obstacle is removed from the monitoring region R. If the obstacle is not a person, the operator moves the obstacle or moves the construction machine 1, whereby the obstacle is removed from the monitoring region R.

In the reset process of S112, for example, a process of canceling the monitoring region R set in S102 is performed. After that, the obstacle determination section 221 monitors a periphery of the construction machine 1 from the distance image acquired by the distance measuring sensor 40. The obstacle determination section 221 starts the flowchart of FIG. 10 when detecting any object.

As described above, according to the present embodiment, the monitoring region R is set such that the region showing the lower travelling body 2 is excluded according to the slewing angle $\alpha$. Therefore, even if the monitoring region R is set widely, the lower travelling body 2 is prevented from being determined as an obstacle, and frequent occurrence of interference avoiding measures such as automatically stopping the construction machine 1 or notifying an alarm can be prevented.

In the present invention, the following modifications can be adopted.

(1) First Modification

Figure 11:
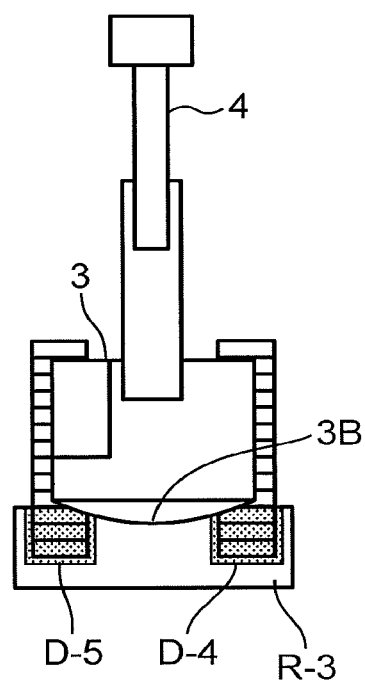
FIG. 11 is a view showing a monitoring region according to a first modification of the present invention.

FIG. 11 is a view showing a monitoring region R-3 in a first modification of the present invention. In a construction machine 1 of FIG. 11, a length in a vertical direction of a lower travelling body 2 is longer than a length in the vertical direction of an upper slewing body 3. Therefore, even when the upper slewing body 3 is directed in the same direction as the lower travelling body 2, a rear end side of the lower travelling body 2 protrudes from a rear side surface 3B of the upper slewing body 3.

In this case, an obstacle determination section 221 may set the monitoring region R-3 so that an exclusion region D-4 including a portion protruding from the rear side surface 3B of a right crawler and an exclusion region D-5 including a portion protruding from the rear side surface 3B of a left side crawler are removed. Here, although the exclusion regions D-4 and D-5 are changed according to a slewing angle $\alpha$, a relationship between the slewing angle $\alpha$ and the exclusion regions D-4, D-5 is known in advance. Therefore, the obstacle determination section 221 may include a table in which a relationship between the slewing angle $\alpha$ and the monitoring region R-3, from which the exclusion regions D-4 and D-5 have been removed, is previously associated. By referring to this table, the obstacle determination section 221 may set the monitoring region R-3.

(2) Second Modification

Figure 12:
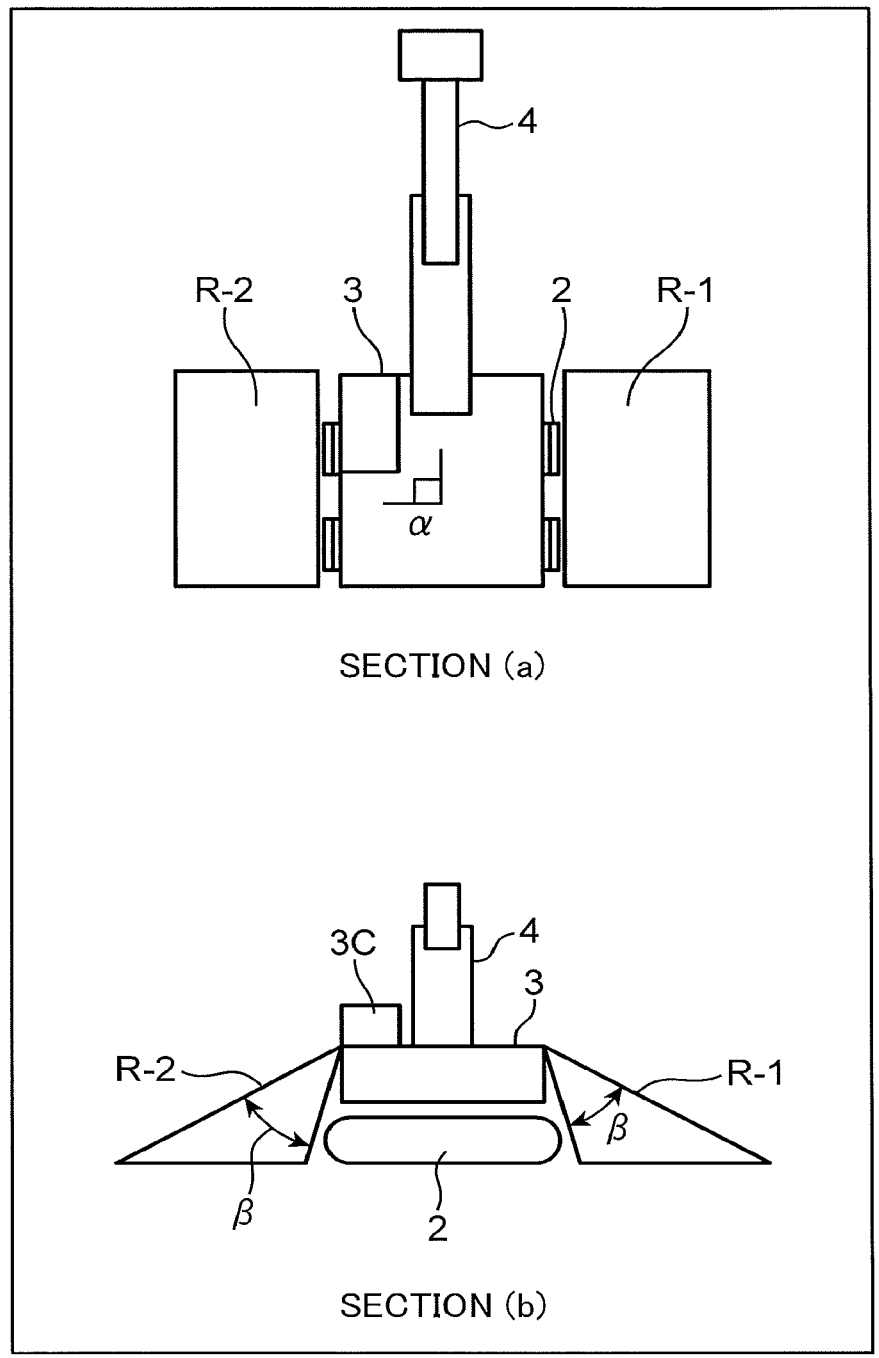
FIG. 12 is a view showing a monitoring region according to a second modification of the present invention.

FIG. 12 is a view showing a monitoring region R in a second modification of the present invention. In FIG. 12, section (a) shows monitoring regions R-1 and R-2 as seen from the top, and section (b) shows the monitoring regions R-1 and R-2 when a construction machine 1 is seen from the rear toward the front. In FIG. 12, a slewing angle $\alpha$ of an upper slewing body 3 and a lower travelling body 2 is 90 degrees, and the upper slewing body 3 takes a lateral posture with respect to the lower travelling body 2.

Refer to section (a) of FIG. 12. In a case where an obstacle is present behind the upper slewing body 3, when the slewing angle $\alpha$ is 90 degrees, even if the lower travelling body 2 moves in a front-rear direction or the upper slewing body 3 slews, a possibility of the construction machine 1 colliding with the obstacle is low. In this case, there is no need to set a monitoring region R-3 behind the upper slewing body 3.

Therefore, in the second modification, when the upper slewing body 3 assumes the lateral posture with respect to the lower travelling body 2, only the monitoring regions R-1 and R-2 are set, and the monitoring region R-3 is not set. This makes it unnecessary to determine whether or not an object has entered the monitoring region R-3, and it is possible to reduce a processing load.

Note that, as shown in section (b) of FIG. 12, in the second modification, a view angle β is set such that the lower travelling body 2 is not included in the monitoring regions R-1 and R-2, as in section (b) of FIG. 8.

(3) Third Modification

When an obstacle enters a monitoring region R-1 or R-2 and a monitoring region R-3, a stop control section 222 may automatically stop both slewing operation and travelling operation regardless of a slewing angle α.

Summary of Embodiment

An obstacle detection device according to an aspect of the present invention is an obstacle detection device for a construction machine including a lower travelling body and an upper slewing body pivotally mounted on an upper portion of the lower travelling body, including: an object detection unit provided on the upper slewing body and for detecting a three-dimensional position of an object located around the construction machine; an angle detection unit for detecting a slewing angle of the upper slewing body with respect to the lower travelling body; and an obstacle determination section for setting a monitoring region around the construction machine so that a region indicating a component of the construction machine is excluded according to the detected slewing angle, and determining the object as an obstacle when the object detected by the object detection unit is located in the set monitoring region.

For example, if the monitoring region is widely set in order to widen a detection range of the obstacle, depending on the slewing angle, the component attached to the construction machine may enter the monitoring region and be determined as the obstacle. Then, if interference avoiding measures such as an operation stop or an alarm is executed in order to avoid interference between the obstacle and the construction machine each time this component is determined as the obstacle, the interference avoiding measures frequently occur and become an obstacle to operator's work.

In this aspect, the monitoring region is set so that the region indicating the component of the construction machine is excluded according to the slewing angle. Therefore, even if the monitoring region is set widely, this component is prevented from being determined as the obstacle, and frequent occurrence of the interference avoiding measures can be prevented. Further, in this aspect, since the monitoring region is set according to the slewing angle, the monitoring region can be set in consideration of a fact that the component entering a detection region of the object detection unit varies according to the slewing angle.

In the above aspect, the obstacle determination section may set the monitoring region so that the lower travelling body is excluded according to the detected slewing angle.

According to this aspect, since the monitoring region is set according to the slewing angle so that the lower travelling body is excluded, it is possible to prevent the lower travelling body from being determined as the obstacle.

In the above-described aspect, the obstacle detection device may further include: a stop control section for determining, based on the detected slewing angle, a component having a possibility that the construction machine collides with the obstacle when the component performs specific operation, and for stopping the specific operation of the determined component.

According to this aspect, the component having the possibility that the construction machine collides with the obstacle when the component performs the specific operation is determined, and the specific operation of the determined component is stopped. Therefore, even if an operator cannot recognize the obstacle, the specific operation of the corresponding component is automatically stopped, and a contact accident can be prevented in advance.

In the above aspect, the object detection unit may be constituted by a three-dimensional distance measuring sensor that irradiates infrared rays.

According to this aspect, since the object is detected by the three-dimensional distance measuring sensor that irradiates infrared rays, it is possible to grasp a shape of the object around the construction machine from a distance contrast. Therefore, the shape of the object can be grasped without being influenced by temperature or brightness.

In the above-described aspect, the obstacle detection device may further include: a display unit, wherein the object detection unit may acquire a distance image expressing the object around the construction machine with a contrast according to a distance, and the obstacle determination section may cause the display unit to display an obstacle image in which objects other than the obstacle have been removed from the acquired distance image.

Since the distance image is an image having a contrast according to a distance unlike a visible image, even if the distance image is displayed on the display unit as it is, it is difficult for an operator to recognize which object is the obstacle.

According to this aspect, since the obstacle image in which only the obstacle is displayed is displayed on the display unit, it is possible for the operator to recognize what obstacle is present without leaving a cabin.

In the above aspect, the obstacle determination section may change the monitoring region by setting a view angle of the detection region of the object detection unit to a predetermined view angle, in which the lower travelling body is excluded, according to the slewing angle.

The region of the lower travelling body entering the detection range of the object detection unit varies according to the slewing angle. However, removal of the lower travelling body from the detection region by setting the view angle of the object detection unit can be specified in advance from a shape of the lower travelling body and a position of the object detection unit.

According to this aspect, since the view angle of the object detection unit is set to the predetermined view angle so that the lower travelling body does not enter in accordance with the slewing angle, the lower travelling body can be prevented from being determined as the obstacle.

In the above-described aspect, the object detection unit may acquire the distance image expressing the object around the construction machine with the contrast according to the distance, and the obstacle determination section may set a monitoring region in the distance image such that a region of the lower travelling body predetermined in accordance with the slewing angle is excluded.

The region of the lower travelling body entering the distance image acquired by the object detection unit varies according to the slewing angle, and this region can be specified in advance from the shape of the lower travelling body and the position of the object detection unit.

According to this aspect, since the region in the distance image of the lower travelling body predetermined in accordance with the slewing angle is set in the distance image and the monitoring region is set so as to exclude the set region, it is possible to prevent the lower travelling body from being determined as the obstacle.

The monitoring region may include a first monitoring region provided on a left side of the upper slewing body and a second monitoring region provided on a right side of the upper slewing body, and when the obstacle is located in at least one of the first and second monitoring regions, the stop control section may stop only slewing operation of the upper slewing body if the upper slewing body is oriented in the same direction as the lower travelling body, and stop the slewing operation and travelling operation of the lower travelling body if the upper slewing body is not oriented in the same direction as the lower travelling body.

When the obstacle is located in the first or second monitoring region, in a case (1) where the upper slewing body is oriented in the same direction as the lower travelling body, even if the lower travelling body travels forward or rearward, a possibility that the construction machine collides with the obstacle is low. Accordingly, it is not necessary to stop the travelling operation of the lower travelling body. Therefore, in this aspect, in the case (1), only the slewing operation of the upper slewing body is stopped.

On the other hand, when the obstacle is located in the first or second monitoring region, in a case (2) where the upper slewing body is not oriented in the same direction as the lower travelling body, the upper slewing body protrudes from the lower travelling body. Accordingly, if either one of the travelling operation and the slewing operation is performed, the construction machine may collide with the obstacle. Therefore, in this aspect, in the case (2), the operation of the upper slewing body and the lower travelling body is stopped.

Therefore, in this aspect, it is possible to stop the operation of only the component having a high risk of interference with the obstacle, and it is possible to suppress excessive operation restrictions.

In the above aspect, the monitoring region may further include a third monitoring region provided behind the upper slewing body, and when the obstacle is located in the third monitoring region, the stop control section may stop only the travelling operation if the upper slewing body is not in a lateral posture with respect to the lower travelling body.

When the obstacle is located in the third monitoring region, in a case (3) where the upper slewing body is not in the lateral posture with respect to the lower travelling body, if the lower travelling body performs the travelling operation, the construction machine may collide with the obstacle. However, in the case (3), even if the slewing operation is performed, the possibility that the construction machine collides with the obstacle is low. Therefore, in this aspect, only the traveling operation of the lower travelling body is stopped.

The invention claimed is:

1. An obstacle detection device for a construction machine including a lower travelling body and an upper slewing body pivotally mounted on an upper portion of the lower travelling body, comprising:
    an object detection unit provided on the upper slewing body and for detecting a three-dimensional position of an object located around the construction machine;
    an angle detection unit for detecting a slewing angle of the upper slewing body with respect to the lower travelling body; and
    an obstacle determination section for setting a monitoring region around the upper slewing body and within a detection region that allows the object detection unit to detect the object so that a region indicating the lower travelling body is excluded according to the detected slewing angle, and determining the object as an obstacle when the object detected by the object detection unit is located in the set monitoring region.

2. The obstacle detection device according to claim 1, further comprising a stop control section for determining, based on the detected slewing angle, a component having a possibility that the construction machine collides with the obstacle when the component performs specific operation, and stopping the specific operation of the determined component.

3. The obstacle detection device according to claim 1, wherein the object detection unit is constituted by a three-dimensional distance measuring sensor that irradiates infrared rays.

4. The obstacle detection device according to claim 1, wherein the obstacle determination section changes the monitoring region by setting a view angle of a detection region of the object detection unit to a predetermined view angle, in which the lower travelling body is excluded, according to the slewing angle.

5. The obstacle detection device according to claim 1, wherein
    the object detection unit acquires a distance image expressing the object around the construction machine with the contrast according to a distance, and
    the obstacle determination section sets a monitoring region in the distance image so that a region of the lower travelling body predetermined according to the slewing angle is excluded.

6. An obstacle detection device for a construction machine including a lower travelling body and an upper slewing body pivotally mounted on an upper portion of the lower travelling body, comprising:
    an object detection unit provided on the upper slewing body and for detecting a three-dimensional position of an object located around the construction machine;
    an angle detection unit for detecting a slewing angle of the upper slewing body with respect to the lower travelling body;
    an obstacle determination section for setting a monitoring region around the construction machine so that a region indicating a component of the construction machine is excluded according to the detected slewing angle, and determining the object as an obstacle when the object detected by the object detection unit is located in the set monitoring region; and
    a display unit, wherein
    the object detection unit acquires a distance image expressing the object around the construction machine with a contrast according to a distance, and
    the obstacle determination section causes the display unit to display an obstacle image in which objects other than the obstacle have been removed from the acquired distance image.

7. An obstacle detection device for a construction machine including a lower travelling body and an upper slewing body pivotally mounted on an upper portion of the lower travelling body, comprising:
    an object detection unit provided on the upper slewing body and for detecting a three-dimensional position of an object located around the construction machine;

an angle detection unit for detecting a slewing angle of the upper slewing body with respect to the lower travelling body;

an obstacle determination section for setting a monitoring region around the construction machine so that a region indicating a component of the construction machine is excluded according to the detected slewing angle, and determining the object as an obstacle when the object detected by the object detection unit is located in the set monitoring region; and a stop control section for determining, based on the detected slewing angle, a component having a possibility that the construction machine collides with the obstacle when the component performs specific operation, and stopping the specific operation of the determined component, wherein the monitoring region includes a first monitoring region provided on a left side of the upper slewing body and a second monitoring region provided on a right side of the upper slewing body, and when the obstacle is located in at least one of the first and second monitoring regions, the stop control section stops only slewing operation of the upper slewing body if the upper slewing body is oriented in a same direction as the lower travelling body, and stops the slewing operation and travelling operation of the lower travelling body if the upper slewing body is not oriented in the same direction as the lower travelling body.

8. The obstacle detection device according to claim 7, wherein the monitoring region further includes a third monitoring region provided behind the upper slewing body, and when the obstacle is located in the third monitoring region, the stop control section stops only the traveling operation if the upper slewing body is not in a lateral posture with respect to the lower travelling body.

* * * * *